(12) United States Patent
Kim et al.

(10) Patent No.: US 8,893,176 B2
(45) Date of Patent: Nov. 18, 2014

(54) METHOD AND APPARATUS FOR RECEIVING AUGMENTED BROADCASTING CONTENT, METHOD AND APPARATUS FOR PROVIDING AUGMENTED CONTENT, AND SYSTEM FOR PROVIDING AUGMENTED CONTENT

(75) Inventors: Soon Choul Kim, Daejeon-si (KR); Jeoung Lak Ha, Daejeon-si (KR); Jung Hak Kim, Daejeon-si (KR); Seung Chul Kim, Daejeon-si (KR); Bum Suk Choi, Daejeon-si (KR); Young Ho Jeong, Daejeon-si (KR); Jin Woo Hong, Daejeon-si (KR)

(73) Assignee: Electronics and Telecommunications Research Institute

( * ) Notice: Subject to any disclaimer, the term of this patent is extended or adjusted under 35 U.S.C. 154(b) by 112 days.

(21) Appl. No.: 13/530,323

(22) Filed: Jun. 22, 2012

(65) Prior Publication Data

US 2013/0104165 A1 Apr. 25, 2013

(30) Foreign Application Priority Data

Oct. 25, 2011 (KR) ........................ 10-2011-0109249

(51) Int. Cl.
- G06F 3/00 (2006.01)
- G06F 13/00 (2006.01)
- H04N 5/445 (2011.01)
- H04N 7/173 (2011.01)

(52) U.S. Cl.
USPC ........................................... 725/37; 725/110

(58) Field of Classification Search
USPC ............ 725/37, 105, 109, 110, 115; 348/563; 5/37, 105, 109, 110, 115
See application file for complete search history.

(56) References Cited

U.S. PATENT DOCUMENTS

| | | | |
|---|---|---|---|
| 6,240,555 B1 * | 5/2001 | Shoff et al. .................... | 725/110 |
| 7,958,505 B2 * | 6/2011 | Addington et al. ........... | 717/177 |
| 2005/0078221 A1 * | 4/2005 | Kobayashi .................... | 348/600 |
| 2005/0162551 A1 * | 7/2005 | Baker ............................ | 348/468 |
| 2009/0150951 A1 * | 6/2009 | Soo et al. ...................... | 725/110 |

FOREIGN PATENT DOCUMENTS

| | | |
|---|---|---|
| KR | 1020060002072 A | 1/2006 |
| KR | 1020100119098 A | 11/2010 |
| WO | 2008/126405 A2 | 10/2008 |

* cited by examiner

*Primary Examiner* — John Schnurr
(74) *Attorney, Agent, or Firm* — Ladas & Parry LLP (57) ABSTRACT

The system includes a metadata generation apparatus for generating metadata to designate a specific space and time in and on which a speech balloon or a music book will be displayed on broadcasting content, a multiplexing broadcasting server for multiplexing the metadata received from the metadata generation apparatus and the broadcasting content and sending the multiplexed result to a reception apparatus, an augmented content providing apparatus for sending the speech balloon suitable for speech included in the broadcasting content or the music book suitable for music included in the broadcasting content to the reception apparatus, and the reception apparatus for displaying the broadcasting content and displaying the augmented content in a specific space and time of the broadcasting content based on the metadata.

15 Claims, 7 Drawing Sheets

METHOD AND APPARATUS FOR RECEIVING AUGMENTED BROADCASTING CONTENT, METHOD AND APPARATUS FOR PROVIDING AUGMENTED CONTENT, AND SYSTEM FOR PROVIDING AUGMENTED CONTENT

Priority to Korean patent application number 10-2011-0109249 filed on Oct. 25, 2011, the entire disclosure of which is incorporated by reference herein, is claimed.

BACKGROUND OF THE INVENTION

1. Field of the Invention

The present invention relates to a method of displaying supplementary information suitable for broadcasting content and, more particularly, to a method of displaying a speech balloon or a music book suitable for the contents of broadcasting content and an apparatus for performing the same.

2. Discussion of the Related Art

As a hybrid broadcasting and communication convergence structure in which broadcasting and communication are combined is activated, augmented broadcasting service has become made possible by combining broadcasting content and augmented content. The augmented broadcasting service is broadcasting service for increasing the sense for the real and the feeling of movement of a viewer and providing selective service reception by naturally converging broadcasting content and augmented content without using a method in which the existing TV viewer is one-sidedly supplied with the broadcasting content transmitted by a broadcasting station. That is, in the existing digital broadcasting, a viewer may receive moving picture service provided by a broadcasting station without change and watch the moving picture service or receive supplementary information service provided for data broadcasting through limited selection. In this environment, a viewer has only to watch caption broadcasting service without choosing a text form produced and transmitted by a broadcasting station or a graphic image displayed on a screen. Furthermore, the conventional caption broadcasting is service in which audio information is converted into visual information, produced by a broadcasting terminal, and provided to a reception terminal, such as text broadcasting service for auditory handicapped persons and speech balloon graphic service for entertainment. This service may function as a factor to hinder viewers who do not want this type of service from watching TV watching because the service is randomly transmitted by not taking a viewer's habit or preference into consideration. Furthermore, if caption broadcasting needs to be serviced in various languages, such as Korean, Japanese, and English in the same caption broadcasting service, so that a viewer may select the caption broadcasting or in a way specific to a watching area, the conventional technology has a limit to a broadcasting bandwidth for data transmission. As described above, in the existing digital broadcasting, caption service is one-sidedly inserted into a broadcasting program and then provided for auditory handicapped persons, and thus the caption service is flat and low in readability. Accordingly, there is a need for a method of representing the dialogue and thinking of the characters (i.e., players or characters) and audio information, such as background music and songs, to a viewer by utilizing speech balloon images (i.e., dialogues exchanged between players are inserted into a balloon) or a music book image visually, intuitively, and effectively when the viewer requires the caption service.

Augmented broadcasting is broadcasting service in which broadcasting content and augmented content are naturally converged in order to increase the sense for the real and the feeling of immersion for a viewer and to provide selective service reception unlike in the existing method in which the existing TV viewer is one-sidedly supplied with broadcasting content transmitted by a broadcasting station. The present invention proposes technology for overcoming the limit of caption broadcasting service in the existing unilateral broadcasting service and providing intuitive and refined caption service to a viewer by utilizing the augmented broadcasting technology.

SUMMARY OF THE INVENTION

An object of the present invention is to provide a method of providing a speech balloon image of a character in broadcasting content according to a viewer's choice and taste or of visually representing a music book image of background music on a screen.

Another object of the present invention is to provide an apparatus for providing a speech balloon image of a character in broadcasting content according to a viewer's choice and taste or for visually representing a music book image of background music on a screen.

A speech balloon or a music book providing system according to an embodiment of the present invention includes a metadata generation apparatus for generating metadata to designate a specific space and time in and on which a speech balloon or a music book will be displayed on broadcasting content, a multiplexing broadcasting server for multiplexing the metadata received from the metadata generation apparatus and the broadcasting content and sending the multiplexed result to a reception apparatus, an augmented content providing apparatus for sending the speech balloon suitable for speech included in the broadcasting content or the music book suitable for music included in the broadcasting content to the reception apparatus, and the reception apparatus for displaying the broadcasting content and displaying the augmented content in a specific space and time of the broadcasting content based on the metadata.

Furthermore, a method of receiving augmented broadcasting content according to another embodiment of the present invention includes receiving broadcasting streams in which broadcasting content and metadata are multiplexed from a multiplexing broadcasting server, parsing the metadata by demultiplexing the broadcasting streams, sending an augmented content request, requesting a speech balloon or a music book, to an augmented content providing apparatus on the basis of the parsed metadata, receiving the speech balloon or the music book from the augmented content providing apparatus, synchronizing the broadcasting content and the speech balloon or the broadcasting content and the music book, and outputting the broadcasting content and displaying the synchronized broadcasting content and speech balloon or the synchronized broadcasting content and music book in a specific region of the broadcasting content on the basis of the metadata. Here, the metadata may include at least one of augmented content position information, a moving picture frame ID value, an intra-frame exposure position, an exposure time, and an augmented content ID value. Furthermore, the method may further include generating configuration setting information including at least one of a shape, color, animation, a font, and a caption language of the speech balloon, and sending the augmented content request may include further sending the configuration setting information to the augmented content providing apparatus. Here, receiving the augmented content request and receiving the augmented content may be performed through an augmented content reception management application received from an additional server.

Furthermore, a method of providing augmented content according to yet another embodiment of the present invention includes receiving an augmented content request to request augmented content, including at least one of a speech balloon and a music book, from a reception apparatus, searching for the augmented content suitable for the augmented content request by parsing the augmented content request, and sending the retrieved augmented content to the reception apparatus. Here, receiving the augmented content request may include further receiving configuration setting information, and searching for the augmented content includes searching for the augmented content suitable for the configuration setting information. Furthermore, the method may further include generating augmented content suitable for the configuration setting information by modifying the augmented content based on the configuration setting information, if the augmented content suitable for the configuration setting information does not exist, and sending the reception apparatus includes sending the generated augmented content.

BRIEF DESCRIPTION OF THE DRAWINGS

The accompanying drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

The present invention may be modified in various ways and may have several embodiments. Specific embodiments of the present invention are illustrated in the drawings and described in detail in the detailed description.

However, the present invention is not intended to be limited to the specific embodiments, and it should be understood that the present invention includes all modifications, equivalents, or substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" or 'have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

The present invention may be modified in various ways and may have several embodiments. Specific embodiments of the present invention are illustrated in the drawings and described in detail in the detailed description. However, the present invention is not intended to be limited to the specific embodiments, and it should be understood that the present invention includes all modifications, equivalents, or substitutions which fall within the spirit and technical scope of the present invention. The same reference numbers will be used throughout the drawings to refer to the same or like parts.

Hereinafter, preferred embodiments of the present invention will be described in detail with reference to the accompanying drawings. The same reference numerals designate the same elements throughout the drawings, and a redundant description of the same elements is omitted.

Figure 1:
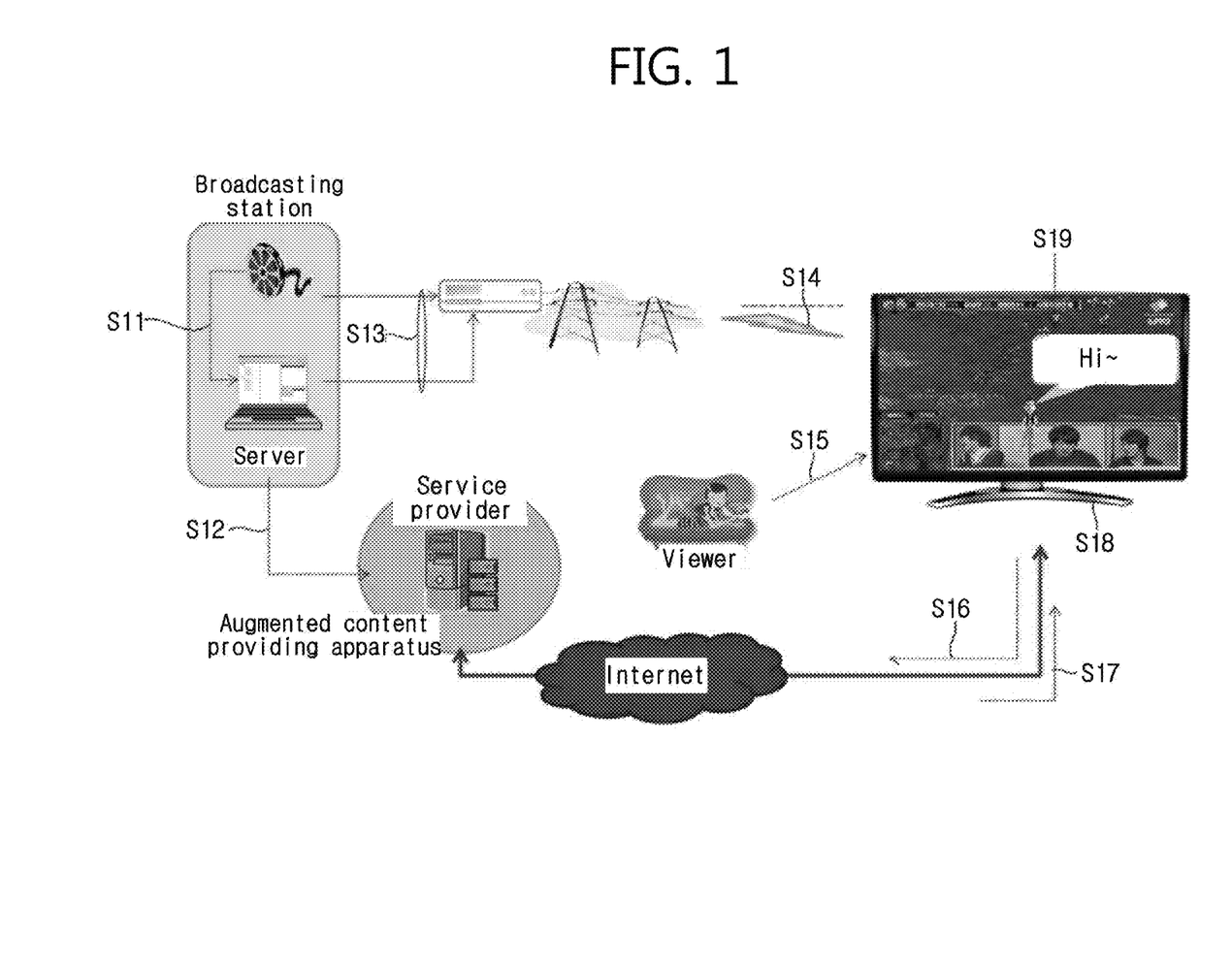
FIG. 1 is a conceptual diagram illustrating a system for providing augmented content including at least one of a speech balloon and a music book according to an embodiment of the present invention.

Concept of a System for Providing Augmented Content Including at Least One of a Speech Balloon and a Music Book FIG. 1 is a conceptual diagram illustrating a system for providing augmented content including at least one of a speech balloon and a music book according to an embodiment of the present invention.

A basic concept of the system for providing augmented content including at least one of a speech balloon and a music book according to the embodiment of the present invention is described below with reference to FIG. 1.

If a broadcasting station produces broadcasting content and provides caption service for augmented broadcasting, the broadcasting station generates augmented broadcasting metadata, including the time and position representing a character (i.e., a dialogue or thinking of a player or object) within the broadcasting content, augmented content position information (i.e., URL), etc. at step S11. Next, the broadcasting station sends broadcasting streams, including the broadcasting content and the metadata, to a reception apparatus at step S14. According to circumstances, the broadcasting content and the metadata may be multiplexed and transmitted at step S13.

The reception apparatus extracts the augmented broadcasting metadata transmitted along with the broadcasting content and receives an augmented broadcasting caption service request from a viewer when the caption service configuration setting information of the viewer exists at step S15. An augmented content request in which caption service is possible is transmitted to an augmented content providing apparatus at step S16. The augmented content providing apparatus receives the metadata from the broadcasting station at step S12 and generates augmented content with reference to the metadata. Next, the augmented content providing apparatus sends the on-line augmented content to the reception apparatus in response to an augmented content request at step S17. The on-line augmented content may be a speech balloon image into which a viewer's taste is incorporated. The reception apparatus composing a broadcasting image of the broadcasting content and the speech balloon image of the augmented content with reference to the augmented metadata and synchronizes them at step S18 and outputs the composed image to a TV screen at step S19. If the viewer no longer receives the augmented broadcasting caption service, the viewer may send a service stop request to the TV screen in order to remove the speech balloon image.

In case of real-time broadcasting content, such as news or a current-affair debate, a viewer may check whether augmented broadcasting caption service is provided to the N screen while watching TV and send a service reception request at step S15. The reception apparatus displays caption data received in real time at a proper position of an image with reference to augmented metadata. In case of previously produced broadcasting content, such as dramas or amusements, an augmented broadcasting application for caption service may previously download augmented content from a server and store the downloaded augmented content in a terminal. Here, a viewer may set a configuration for the caption service (i.e., a speech balloon shape, color, animation, a font, and a caption language).

Figure 2:
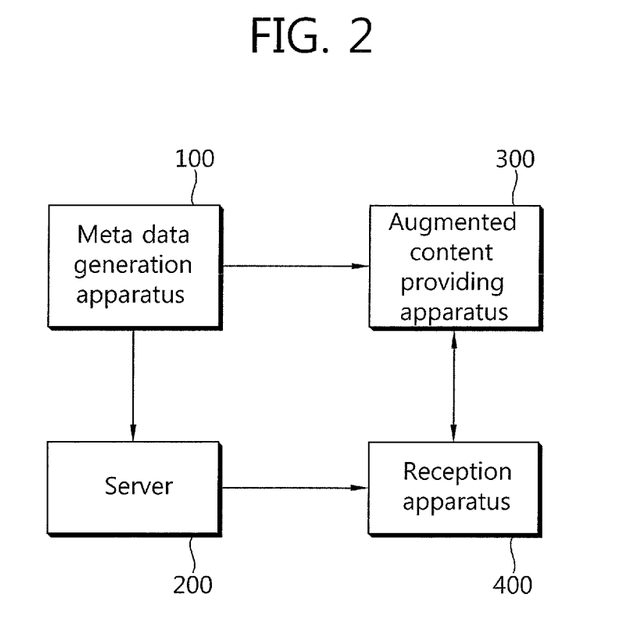
FIG. 2 shows the construction of the system for providing augmented content including at least one of a speech balloon and a music book shown in FIG. 1.

System for Providing Augmented Content Including at Least One of a Speech Balloon and a Music Book FIG. 2 shows the construction of the system for providing augmented content including at least one of a speech balloon and a music book shown in FIG. 1. Each of the elements of the speech balloon or a music book providing system according to an embodiment of the present invention is clearly described with reference to FIG. 2.

As shown in FIG. 2, the system for providing augmented content including at least one of a speech balloon and a music book according to the embodiment of the present invention includes a metadata generation apparatus 100 for generating metadata to designate a specific space and time in and on which augmented content including at least one of a speech balloon and a music book may be displayed on broadcasting content, a server 200 for sending the metadata received from the metadata generation apparatus 100 and broadcasting streams including the broadcasting content to a reception apparatus 400, an augmented content providing apparatus 300 for sending augmented content, including at least one of a speech balloon suitable for speech included in the broadcasting content and a music book suitable for music included in the broadcasting content, to the reception apparatus 400, and the reception apparatus 400 for displaying the broadcasting content and displaying the augmented content at specific space and time of the broadcasting content on the basis of the metadata.

The metadata generation apparatus 100 selects broadcasting content that will provide a speech balloon or a music book from previously produced broadcasting content and generates metadata to designate a specific space and time in and on which augmented content including at least one of a speech balloon and a music book will be displayed on the broadcasting content. The metadata generation apparatus 100 selects a position so that speech or the subject of thinking displayed as a speech balloon and the speech balloon have a correlation and a viewer may clearly know the subject of a speech balloon.

When the metadata is generated, the metadata generation apparatus 100 sends the metadata to the augmented content providing apparatus 300 so that augmented content to be represented in the broadcasting content is previously generated. Furthermore, the metadata generation apparatus 100 sends the metadata to the server 200. The server 200 generates broadcasting streams including the metadata and the broadcasting content and sends the broadcasting streams to the reception apparatus 400. According to circumstances, the broadcasting content and the metadata may be multiplexed and transmitted.

The reception apparatus 400 receives the metadata and the broadcasting content, displays the broadcasting content, requests the augmented content from the augmented content providing apparatus 300 on the basis of the metadata, and receives the augmented content. Next, the reception apparatus 400 may display the augmented content in the specific space and time of the broadcasting content and provide a viewer with refined speech balloon service including multi-media-content.

Method of Receiving Augmented Broadcasting Content

Figure 3:
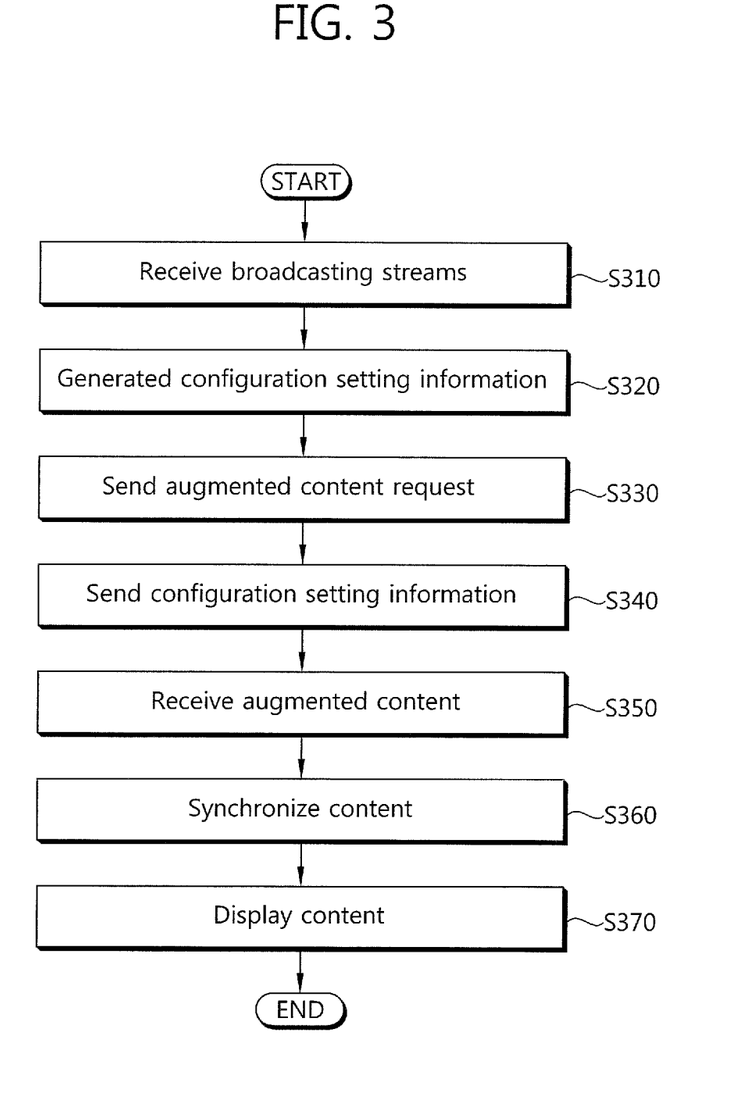
FIG. 3 is a flowchart illustrating a method of receiving augmented broadcasting content according to an embodiment of the present invention.

FIG. 3 is a flowchart illustrating a method of receiving augmented broadcasting content according to an embodiment of the present invention.

As shown in FIG. 3, the method of receiving augmented broadcasting content according to the embodiment of the present invention may include a step S310 of receiving broadcasting streams, including broadcasting content and metadata, from the server 200, a step S330 of sending an augmented content request to request augmented content, including at least one of a speech balloon and a music book, to the augmented content providing apparatus 300 on the basis of the received metadata, a step S350 of receiving the augmented content from the augmented content providing apparatus 300, a step S360 of synchronizing the broadcasting content and the augmented content, and a step S370 of displaying the synchronized broadcasting content and the augmented content on the basis of the metadata so that the augmented content is placed in a specific region of the broadcasting content. According to circumstances, the method of receiving augmented broadcasting content may further include a step S320 of a viewer generating configuration setting information for setting a configuration (i.e., a speech balloon shape, color, animation, a font, and a caption language) for caption service and a step S340 of the viewer sending the configuration setting information to the augmented content providing apparatus 300.

In the step S310 of receiving broadcasting streams, including broadcasting content and metadata, from the server 200, broadcasting content where a speech balloon will be displayed and metadata for a region where the speech balloon will be displayed on the broadcasting content are received. The metadata may include at least one of augmented content position information, moving picture frame ID value, an intra-frame exposure position, the exposure time, and an augmented content ID value.

The augmented content position information indicates access information about an augmented content request apparatus from which the reception apparatus 400 will request augmented content. If an Internet network is used, the augmented content position information may have a form, such as a URL or an URI. The moving picture frame ID value indicates information about frames where the speech balloon will be displayed on the broadcasting content. The information about frames includes information from a frame where the speech balloon starts being displayed to a frame where the display of the speech balloon is ended. The frame information may be indicated by the elapse time after broadcasting content is started without using an additional frame ID symbol. The intra-frame exposure position may specify whether augmented content is displayed at which position of a screen on a frame indicated by the moving picture frame ID value. The exposure time may include a term for which the display of augmented content is maintained from a frame where the display of the augmented content is started if only the frame is specified in the moving picture frame ID value. The augmented content ID value indicates a value assigned in order to identify augmented content including the speech balloon or the music book. Since a plurality of pieces of broadcasting content and a plurality of pieces of augmented content exist, ID values capable of distinguishing the plurality of pieces of augmented content from each other are assigned in order to properly provide augmented content suitable for broadcasting content.

In order to provide speech balloon service suitable for a viewer's taste and request, configuration setting information on which the viewer may set the characteristic of a speech balloon is generated at step S320. The configuration setting information may include at least one of a shape, color, animation, a font, and a caption language of a speech balloon. The shape of a speech balloon may have various shapes, such as a balloon shape, a square having a round corner, and a star shape. A viewer may select the color of a speech balloon and may set animation in which the shape of a speech balloon is changing or an emoticon is moving within a speech balloon. A viewer may also select a calligraphic style of a letter represented within a speech balloon. A font for the calligraphic style may be stored in the reception apparatus 400 or the augmented content providing apparatus 300 or an additional font may be downloaded from an additional server. If an additional font is downloaded and installed, the reception apparatus 400 may send the font to the augmented content providing apparatus 300. A caption language, such as English, Korean, Japanese, or Chinese, may be set at the request of a viewer.

Next, the step S330 of sending an augmented content request to request augmented content, including at least one of a speech balloon and a music book, to the augmented content providing apparatus 300 on the basis of the received metadata and the step S340 of sending the generated configuration setting information to the augmented content providing apparatus 300 are performed. The augmented content is received from the augmented content providing apparatus 300 at step S350. Here, the step of S330 of requesting the augmented content and the step S350 of receiving the augmented content may be performed through an augmented content reception management application received from an additional server.

After the broadcasting content and the augmented content are received as described above, a step of displaying the broadcasting content and the augmented content is performed. First, the broadcasting content and the augmented content are synchronized with reference to the metadata at step S360. Next, the synchronized broadcasting content and augmented content are displayed so that the augmented content is placed in a specific region of the broadcasting content on the basis of the metadata at step S370. The reception apparatus 400 may directly display the broadcasting content and the augmented content and send output information about the broadcasting content and the augmented content to an additional output device.

Method of Providing Augmented Content

Figure 4:
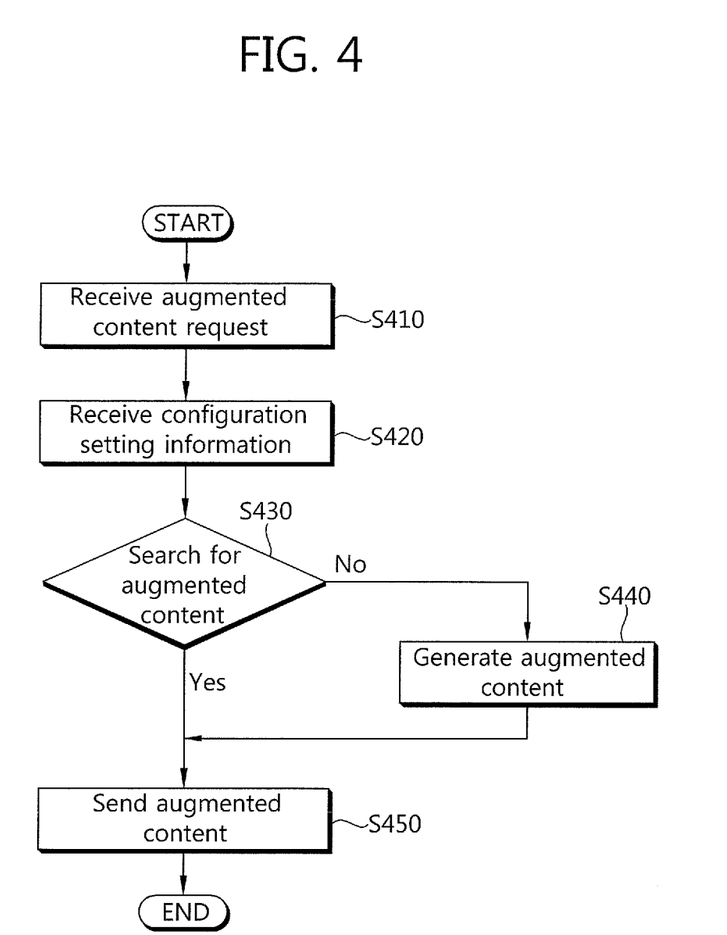
FIG. 4 is a flowchart illustrating a method of providing augmented content according to an embodiment of the present invention.

FIG. 4 is a flowchart illustrating a method of providing augmented content according to an embodiment of the present invention.

As shown in FIG. 4, the method of providing augmented content according to the embodiment of the present invention may include a step S410 of receiving an augmented content request to request augmented content, including at least one of a speech balloon and a music book, from the reception apparatus 400, a step S430 of searching for the augmented content suitable for the augmented content request by parsing the augmented content request, and a step S450 of sending the retrieved augmented content to the reception apparatus 400. According to circumstances, the method may further include a step S420 of receiving configuration setting information about a speech balloon. In the step S430 of searching for the augmented content, augmented content suitable for the configuration setting information may be searched for.

More particularly, the augmented content providing apparatus 300 receives an augmented content request to request augmented content, including at least one of a speech balloon and a music book suitable for broadcasting content received by the reception apparatus 400 with reference to received metadata, from the reception apparatus 400 at step S410. As described above, in order to provide speech balloon service suitable for a viewer's taste and request, the reception apparatus 400 generates configuration setting information which may include at least one of a shape, color, animation, a font, and a caption language of a speech balloon on which a viewer may set the characteristic of the speech balloon. Accordingly, the configuration setting information is received from the reception apparatus 400 at step S420.

A speech balloon or a music book suitable for the viewer's taste and request defined in the configuration setting information is searched for in the storage unit of the augmented content providing apparatus 300 on the basis of the augmented content request and the configuration setting information. The augmented content providing apparatus 300 may previously generate and store augmented content satisfying option which may be set in the configuration setting information on the basis of metadata received from the server 200. Here, pieces of augmented content for all settings regarding parts which may be simply changed according to user setting, such as a change of color or a font and a change of a shape, are not produced. Accordingly, efforts and time necessary to produce augmented content may be reduced, and the storage space of the storage unit of the augmented content providing apparatus 300 may be efficiently. According to circumstances, if, as a result of the search for the augmented content at step S430, augmented content suitable for the configuration setting information exists, the retrieved augmented content is transmitted to the reception apparatus 400 at step S450. If, as a result of the search for the augmented content at step S430, augmented content suitable for the configuration setting information does not exist, the augmented content is modified on the basis of the configuration setting information and augmented content suitable for the configuration setting information is generated at step S440. In the step S450 of sending the augmented content to the reception apparatus 400, the generated augmented content may be transmitted to the reception apparatus 400. For example, configuration setting information of a user indicates that a speech balloon of a balloon shape having a pink background is provided. If only a speech balloon of a balloon shape having a white background exists as a result of search for augmented content, a speech balloon of a balloon shape having a pink background may be generated by modifying the speech balloon of a balloon shape having the white background and then transmitted to the reception apparatus 400.

Reception Apparatus

Figure 5:
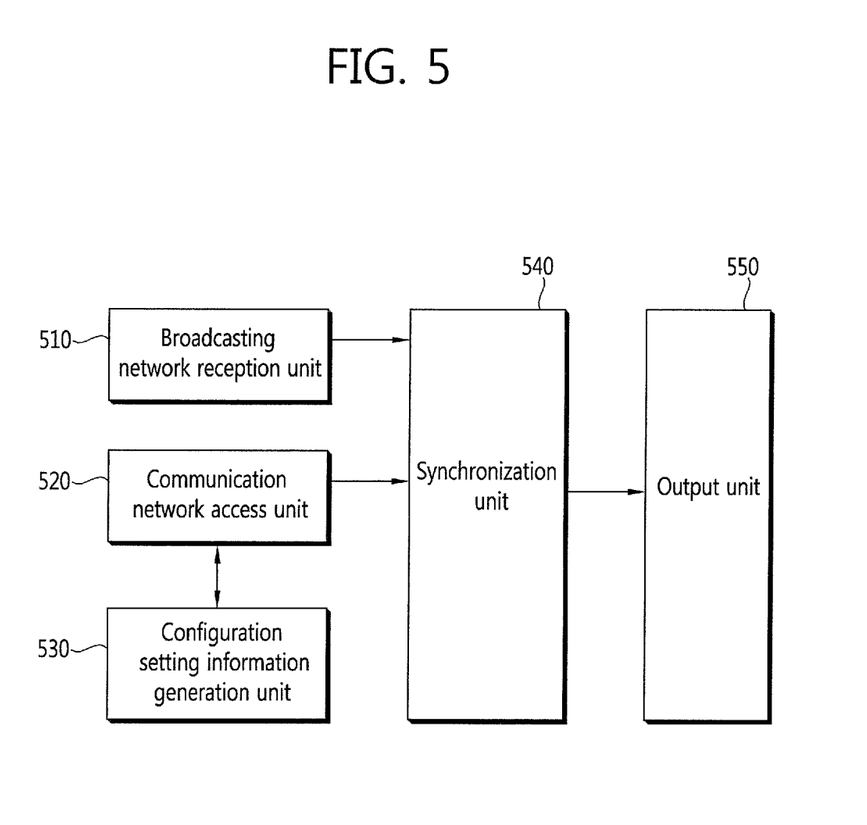
FIG. 5 shows the construction of a reception apparatus according to an embodiment of the present invention.

FIG. 5 shows the construction of the reception apparatus 400 according to an embodiment of the present invention.

As shown in FIG. 5, the reception apparatus 400 according to an embodiment of the present invention includes a broadcasting network reception unit 510 for receiving broadcasting streams, including broadcasting content and metadata, from the server 200, a communication network access unit 520 for sending an augmented content request to request augmented content, including at least one of a speech balloon and a music book, on the basis of the received metadata to the augmented content providing apparatus 300 and receiving the augmented content from the augmented content providing apparatus 300, a synchronization unit 540 for synchronizing the broadcasting content and the augmented content, and an output unit 550 for displaying the synchronized broadcasting content and augmented content so that the augmented content is placed in a specific region of the broadcasting content on the basis of the metadata.

The metadata may include at least one of augmented content position information, a moving picture frame ID value, an intra-frame exposure position, the exposure time, and an augmented content ID value.

The reception apparatus 400 may further include a configuration setting information generation unit 530 for generating configuration setting information including at least one of a shape, color, animation, a font, and a caption language of the speech balloon. The communication network access unit 520 may send the configuration setting information to the augmented content providing apparatus 300.

A detailed method of receiving augmented broadcasting content is the same as the method of receiving augmented broadcasting content.

Augmented Content Providing Apparatus

Figure 6:
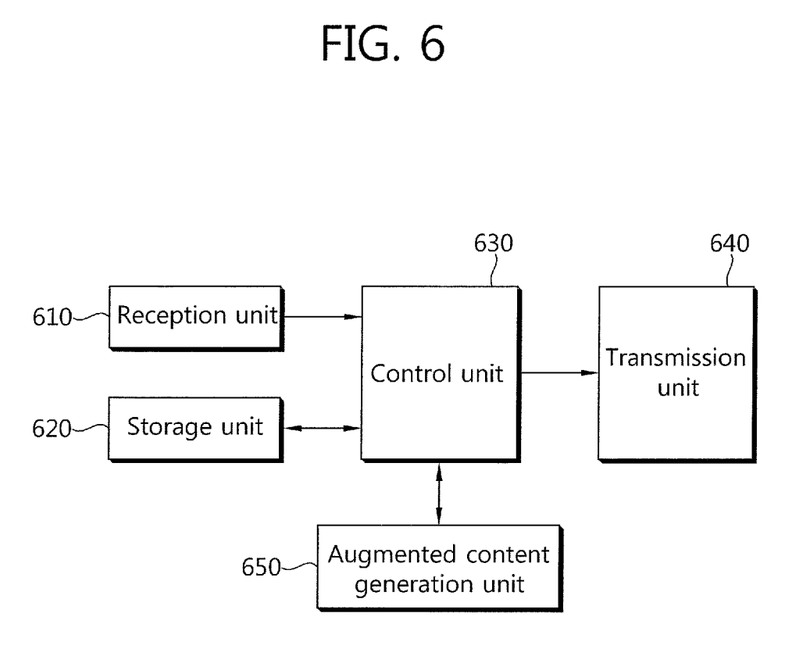
FIG. 6 shows the construction of the augmented content providing apparatus according to an embodiment of the present invention.

FIG. 6 shows the construction of the augmented content providing apparatus 300 according to an embodiment of the present invention.

As shown in FIG. 6, the augmented content providing apparatus 300 according to the embodiment of the present invention may include a storage unit 620 for storing augmented content including at least one of a speech balloon and a music book, a reception unit 610 for receiving an augmented content request, requesting the augmented content, from the reception apparatus 400, a control unit 630 for searching the storage unit 620 for the augmented content suitable for the augmented content request by parsing the augmented content request, and a transmission unit 640 for sending the retrieved augmented content to the reception apparatus 400.

Here, the reception unit 610 may further receive configuration setting information, and the control unit 630 may search the storage unit 620 for the augmented content suitable for the configuration setting information.

The augmented content providing apparatus 300 further includes an augmented content generation unit 650 for generating augmented content suitable for the configuration setting information by modifying the augmented content on the basis of the configuration setting information, if the augmented content suitable for the configuration setting information does not exist. The transmission unit 640 may send the generated augmented content.

A detailed method of providing augmented content is the same as the method of providing augmented content.

Embodiment

Figure 7:
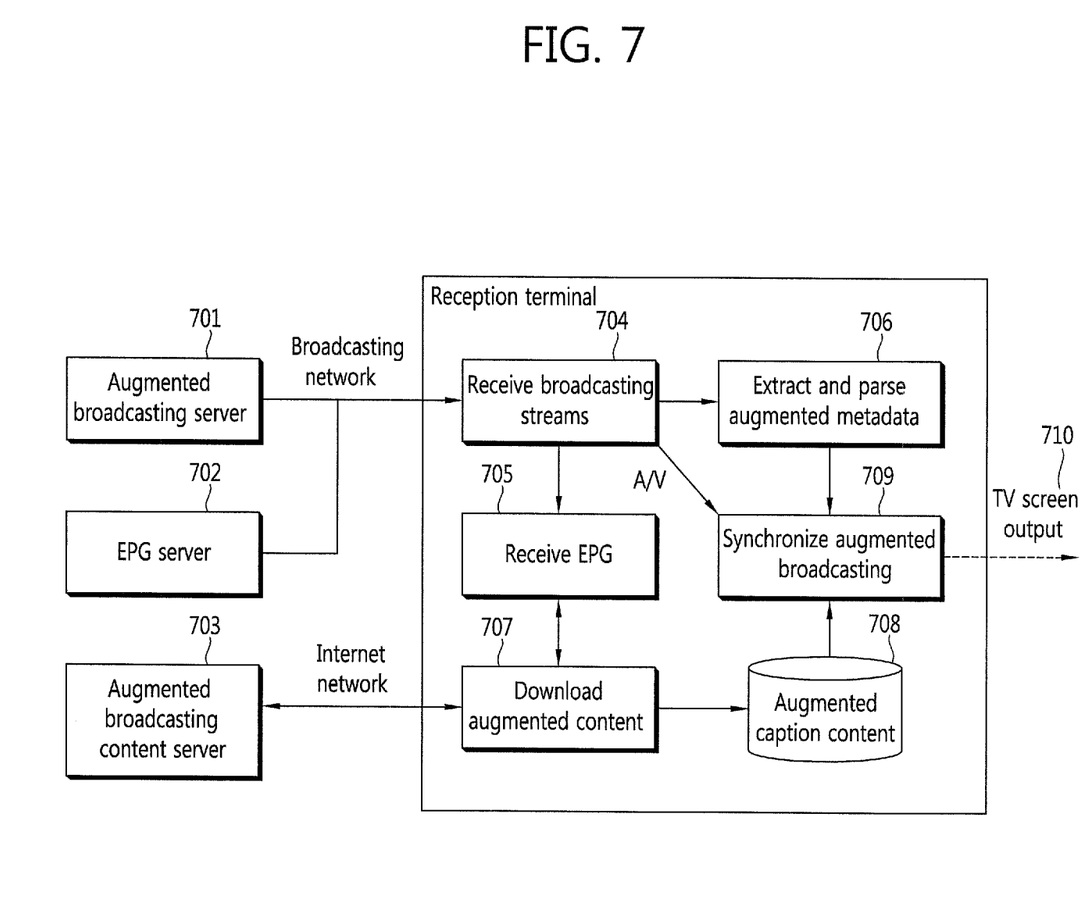
FIG. 7 is a procedural diagram in which the system for providing augmented content including at least one of a speech balloon and a music book shown in FIG. 1 is displayed on the basis of a terminal reception stage.

FIG. 7 is a procedural diagram in which the system for providing a speech balloon or a music book shown in FIG. 1 is displayed on the basis of a terminal reception stage. An embodiment of the present invention is described below with reference to FIG. 7 on the basis of the terminal reception stage.

First, a broadcasting station operates an augmented broadcasting server 701 and an EPG server 702 in order to provide augmented broadcasting service over a broadcasting network. The augmented broadcasting server 701 includes not only moving picture programs, but also metadata describing augmented content associated with the moving picture programs. The EPG server 702 for providing guide information about a broadcasting program transmitted by the broadcasting station provides a reception terminal with information about an augmented broadcasting program channel. A moving picture program transmitted by the augmented broadcasting server 710 and program guide information transmitted by the EPG server 702 are mixed and transferred to the reception terminal over a broadcasting network. The reception terminal receives broadcasting streams and separates them into A/V, EPG information, and augmented metadata (704). An augmented content download manager refers to augmented broadcasting channel information included in the EPG information (705). The augmented content download manager accesses an augmented broadcasting content server 703 placed on-line (Internet network) on the basis of the augmented broadcasting channel information, downloads augmented caption content (707), and stores the downloaded augmented caption content in the depository of the reception terminal (708). The augmented content download manager may be executed by a browser embedded in the reception terminal or may be downloaded from an additional TV App Store and executed by an application installed in the reception terminal. When a viewer uses augmented broadcasting through the reception terminal, the reception terminal parses augmented metadata, separated from broadcasting streams, in real time (706). Information parsed through augmented metadata is information where augmented content within a moving picture program will be placed, and it basically includes a moving picture frame ID value, an intra-frame exposure position, the exposure time, and an augmented content ID value. Finally, synchronization is performed within a moving picture program by using attribute information within the metadata and the augmented caption content (709). The synchronized broadcasting program is outputted through a TV screen, and a viewer may watch a shape of a player within a broadcasting program through a speech balloon image.

In accordance with the speech balloon or music book providing system, the method and apparatus for receiving augmented broadcasting content, and the method and apparatus for providing augmented content, a speech balloon image of a character of broadcasting content may be provided according to a viewer's choice and taste or a music book image of background music may be visually represented. Accordingly, the quality of a broadcasting program may be improved, and a viewer may be immersed in TV watching through supplementary information with the sense for the real. Consequently, a broadcasting station may induce a viewer's participation and makes advertising earnings through a further improved viewing effect, and an augmented broadcasting caption service provider may configure distinct caption service and make earnings for entertainment, education, advertising, and handicapped person broadcasting.

Furthermore, the present invention may be applied to all industrial fields to which broadcasting content is applied, such as a broadcasting service provider, an advertising service provider, and a content service provider. A user may select a desired time and various representation methods for caption service and effectively watch broadcasting content without using a method in which the existing broadcasting station one-sidedly provides a speech balloon effect for caption service or entertainment for handicapped persons. Furthermore, news or the speech contents of dramas may be represented on a screen as additional language service, such as English, Japanese, and Chinese, to a viewer who wants to study a foreign language for education purposes. Accordingly, it is expected that the participation of a viewer in a broadcasting program may be increased and a profit model of a broadcasting program may be extended.

While the invention has been shown and described with respect to the preferred embodiments, it will be understood by those skilled in the art that various changes and modifications may be made without departing from the spirit and scope of the invention as defined in the following claims.

What is claimed is:

1. A method of receiving augmented broadcasting content, comprising:
   receiving, by a reception terminal, broadcasting streams, including broadcasting content and metadata, from a broadcasting server communicating with the reception terminal over a network, the metadata describing augmented content associated with the broadcasting content;
   sending, by the reception terminal, an augmented content request to request augmented content, including at least one of a speech balloon and a music book, to an augmented content providing apparatus communicating with the reception terminal over a network, wherein the augmented content providing apparatus is accessed using the metadata describing augmented content received from the broadcasting server, and wherein the augmented content request includes configuration setting information that includes a speech balloon shape and a speech balloon color, and further comprising searching the augmented content in the augmented content providing apparatus to determine whether the speech balloon shape and color exist, and
   if the speech balloon shape and color exist in the augmented content of the augmented content providing apparatus, transmitting the augmented content including the speech balloon shape and the speech balloon color to the reception terminal, and
   if the speech balloon shape and color do not exist in the augmented content of the augmented content providing apparatus, modifying existing augmented content including an existing speech balloon shape and an existing speech balloon color on the basis of the configuration setting information that includes the speech balloon shape and the speech balloon color;
   receiving the augmented content from the augmented content providing apparatus;
   synchronizing the broadcasting content and the augmented content; and
   displaying the synchronized broadcasting content and augmented content so that the augmented content is placed in a specific region of the broadcasting content based on the metadata describing augmented content.

2. The method as claimed in claim 1, wherein the metadata includes at least one of augmented content position information, a moving picture frame ID value, an intra-frame exposure position, an exposure time, and an augmented content ID value.

3. The method as claimed in claim 1, wherein the configuration setting information is set by a user.

4. The method as claimed in claim 1, wherein receiving the augmented content request and receiving the augmented content are performed through an augmented content reception management application received from an additional server.

5. The method as claimed in claim 1, wherein receiving broadcasting streams, including broadcasting content and metadata from a server comprises:
   receiving moving picture programs,
   receiving metadata describing augmented content associated with the moving picture programs, and
   receiving, from an electronic programming guide (EPG) server, EPG information about a broadcasting program transmitted by a broadcasting station to provide information about an augmented broadcasting program channel,
   wherein sending an augmented content request to request augmented content and receiving the augmented content comprise:
   referring to, by an augmented content download manager, augmented broadcasting channel information included in the EPG information,
   accessing, by the augmented content download manager, the augmented content providing apparatus on the basis of the augmented broadcasting channel information, wherein the augmented content providing apparatus is placed on line and connected to the reception terminal through the Internet, and
   downloading the augmented content from the augmented content providing apparatus and storing the downloaded augmented content in a depository of the reception terminal;
   wherein synchronizing the broadcasting content and the augmented content and displaying the synchronized broadcasting content and augmented content comprise;
   parsing the metadata describing augmented content in real time and
   performing synchronization within a moving picture program by using the metadata describing augmented content.

6. The method as claimed in claim 5, wherein the access information is a uniform resource locator (URL) or a uniform resource identifier (URI).

7. The method as claimed in claim 1, wherein the reception terminal accesses the augmented content providing apparatus using access information that is received from the broadcast server, the access information being information about the augmented content request apparatus from which the reception apparatus requests augmented content.

8. A method of providing augmented content, comprising:
   receiving, by an augmented content providing apparatus, metadata describing augmented content from a broadcasting server;
   generating, by the augmented content providing apparatus, augmented content by using the metadata describing augmented content received from the broadcast server;
   receiving, by the augmented content providing apparatus, an augmented content request to request augmented content, including at least one of a speech balloon and a music book, from the reception apparatus connected to the augmented content providing apparatus through a network;

searching, by the augmented content providing apparatus, for the augmented content suitable for the augmented content request by parsing the augmented content request;

receiving a configuration setting information request that includes a speech balloon shape and a speech balloon color, and searching the augmented content in the augmented content providing apparatus to determine whether the speech balloon shape and color exist, and if the speech balloon shape and color exist in the augmented content of the augmented content providing apparatus, transmitting the augmented content including the speech balloon shape and the speech balloon color to a reception apparatus, and if the speech balloon shape and color do not exist in the augmented content of the augmented content providing apparatus, modifying existing augmented content including an existing speech balloon shape and an existing speech balloon color on the basis of the configuration setting information that includes the speech balloon shape and the speech balloon color; and sending, by the augmented content providing apparatus, the retrieved augmented content to the reception apparatus.

9. A reception apparatus, comprising:

a broadcasting network reception unit for receiving broadcasting streams, including broadcasting content and metadata, from a broadcast server communicating with the reception terminal over a network, the metadata describing augmented content associated with the broadcasting content;

a communication network access unit for sending an augmented content request to request augmented content, including at least one of a speech balloon and a music book, to an augmented content providing apparatus that is communicating with the reception terminal over a network, wherein the augmented content proving apparatus is accessed using the metadata describing augmented content received from the broadcasting server, and for receiving the augmented content from the augmented content providing apparatus, and wherein the augmented content request further includes a request for a speech balloon shape, and if the speech balloon shape exists in the augmented content of the augmented content providing apparatus, receiving the existing augmented content including the speech balloon shape, and if the speech balloon shape does not exist in the augmented content of the augmented content providing apparatus, receiving modified augmented content including a modified speech balloon shape;

a synchronization unit for synchronizing the broadcasting content and the augmented content; and an output unit for displaying the synchronized broadcasting content and augmented content so that the augmented content is placed in a specific region of the broadcasting content based on the metadata describing augmented content.

10. The reception apparatus as claimed in claim 9, wherein the metadata includes at least one of augmented content position information, a moving picture frame ID value, an intra-frame exposure position, an exposure time, and an augmented content ID value.

11. The reception apparatus as claimed in claim 9, wherein the communication network access unit is controlled through an augmented content reception management application received from an additional server.

12. The method as clamed in claim 9, wherein the reception terminal communicates with the broadcasting server over a broadcasting network and the reception terminal communicates with the augmented content providing apparatus over the Internet.

13. An augmented content providing apparatus, comprising:

a storage unit for storing augmented content including at least one of a speech balloon and a music book;

a reception unit for receiving an augmented content request, requesting augmented content, and configuration setting information from a reception apparatus communicating with the augmented content providing apparatus through a network, and wherein the augmented content request further includes a request for a speech balloon shape, and if the speech balloon shape exists in the augmented content of the augmented content providing apparatus, communicating to the reception apparatus the existing augmented content including the speech balloon shape, and if the speech balloon shape does not exist in the augmented content of the augmented content providing apparatus, communicating to the reception apparatus a speech balloon shape modified from an existing speech balloon shape;

a control unit for searching the storage unit for the augmented content corresponding the configuration setting information by parsing the augmented content request a transmission unit for sending the retrieved augmented content to the reception apparatus; and wherein the augmented content generation unit for generating augmented content suitable for the configuration setting information by modifying the augmented content that was previously stored in the storage unit based on the configuration setting information, when it is determined that the augmented content suitable for the configuration setting information does not exist in the storage unit, wherein the transmission unit sends the generated augmented content, wherein the augmented content providing apparatus receives metadata describing augmented content from a broadcasting server and generates the augmented content by using the metadata describing augmented content received from the broadcasting server.

14. A speech balloon or music book providing system, comprising:

a metadata generation apparatus for generating metadata to designate a specific space and time in and on which augmented content including at least one of a speech balloon and a music book will be displayed on broadcasting content;

a broadcast server for sending broadcasting streams, including the metadata received from the metadata generation apparatus and the broadcasting content, to a reception apparatus;

an augmented content providing apparatus for receiving metadata describing augmented content from the broadcast server, for generating augmented content by using the metadata describing augmented content received from the server, for searching the augmented content in the augmented content providing apparatus to determine whether a requested speech balloon shape and requested speech balloon color exist, and if the speech balloon shape and color exist in the augmented content of the augmented content providing apparatus, transmitting the augmented content including the speech balloon shape and the speech balloon color to a reception apparatus, and if the speech balloon shape and color do not exist in the augmented content of the augmented content providing apparatus, modifying existing augmented content including an existing speech balloon shape and an existing speech balloon color on the basis of the requested speech balloon shape and speech balloon color, and for sending augmented content, including at least one of the speech balloon suitable for speech included in the broadcasting content and the music book suitable for music included in the broadcasting content, to the reception apparatus; and the reception apparatus for displaying the broadcasting content and displaying the augmented content in a specific space and time of the broadcasting content based on the metadata.

15. The method as claimed in claim 14, wherein the reception apparatus communicates with the broadcasting server over a broadcasting network and the reception apparatus communicates with the augmented content providing apparatus over the Internet.

\* \* \* \* \*